(12) United States Patent
Park et al.

(10) Patent No.: US 9,141,283 B2
(45) Date of Patent: Sep. 22, 2015

(54) APPARATUS AND METHOD FOR INPUTTING CHARACTERS ON TOUCH SCREEN OF A TERMINAL

(75) Inventors: Se-Hwan Park, Suwon-si (KR);
Keun-Ho Shin, Suwon-si (KR);
Woo-Jei Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 1016 days.

(21) Appl. No.: 12/022,692

(22) Filed: Jan. 30, 2008

(65) Prior Publication Data

US 2008/0180403 A1     Jul. 31, 2008

(30) Foreign Application Priority Data

Jan. 30, 2007 (KR) .................. 10-2007-0009602
Aug. 7, 2007 (KR) .................. 10-2007-0079243
Nov. 5, 2007 (KR) .................. 10-2007-0112148

(51) Int. Cl.
*G06F 3/041* (2006.01)
*G06F 3/0488* (2013.01)
*G06F 3/023* (2006.01)

(52) U.S. Cl.
CPC .......... *G06F 3/04886* (2013.01); *G06F 3/0237* (2013.01)

(58) Field of Classification Search
CPC ......... G06F 3/016; G06F 3/011; G06F 3/038;
G06F 3/03543; G06F 3/0338; G06F 3/0202;
G06F 3/0219; G06F 3/0213; G06F 1/1616;
G06F 3/023; G06F 3/0488; G06F 3/04883;
G06F 3/044; G06F 3/04886; G06F 3/045

USPC ......................... 345/156, 168, 173
See application file for complete search history.

(56) References Cited

U.S. PATENT DOCUMENTS

| | | | |
|---|---|---|---|
| 6,170,000 B1 | 1/2001 | Bories et al. | |
| 6,178,989 B1 | 1/2001 | Windschmitt et al. | |
| 6,562,078 B1 * | 5/2003 | Yang et al. ............ | 715/202 |
| 7,245,290 B2 | 7/2007 | Sugano | |
| 7,505,627 B2 | 3/2009 | Chang et al. | |
| 2005/0049861 A1 | 3/2005 | Sugano | |

(Continued)

FOREIGN PATENT DOCUMENTS

| | | |
|---|---|---|
| CN | 1216602 | 5/1999 |
| CN | 1407434 | 4/2003 |

(Continued)

OTHER PUBLICATIONS

Daisuke Sato et al., "Popie: A Japanese Input Method Utilizing FlowMenu", IPSJ Journal, Information Processing Society of Japan, Jul. 15, 2006.

*Primary Examiner* — Christopher E Leiby
(74) *Attorney, Agent, or Firm* — The Farrell Law Firm, P.C.

(57) ABSTRACT

An apparatus and method for inputting a character on a touch keyboard in a terminal, in which a touch screen displays a basic key set and an extended key set, the basic key set including with consonant keys and the extended key set including character keys corresponding to characters combinable with a consonant corresponding to a consonant key input from the basic key set, and a controller for controlling the touch screen to display the extended key set, upon input of the consonant key from the basic key set, and receiving at least one character from the basic key set and the extended key set are provided.

28 Claims, 7 Drawing Sheets

(56) References Cited

U.S. PATENT DOCUMENTS

| | | | |
|---|---|---|---|
| 2005/0052431 A1* | 3/2005 | Chang | 345/173 |
| 2005/0275632 A1 | 12/2005 | Pu et al. | |
| 2007/0052682 A1* | 3/2007 | Kang et al. | 345/173 |
| 2009/0073137 A1 | 3/2009 | Gao et al. | |

FOREIGN PATENT DOCUMENTS

| | | |
|---|---|---|
| DE | 10 2004 041 895 | 8/2004 |
| JP | 06-202784 | 7/1994 |
| JP | 2000-181608 | 6/2000 |
| JP | 2002-108543 | 4/2002 |
| JP | 2004-133915 | 4/2004 |
| JP | 2005-078211 | 3/2005 |
| JP | 2005-129014 | 5/2005 |
| JP | 2005-182487 | 7/2005 |
| JP | 2005-535975 | 11/2005 |
| JP | 2006-023950 | 1/2006 |
| KR | 1020000042231 | 7/2000 |
| KR | 1020020016030 | 3/2002 |
| KR | 1020030008873 | 1/2003 |
| KR | 1020040016365 | 2/2004 |
| KR | 1020050025267 | 3/2005 |
| KR | 1020050073910 | 7/2005 |
| KR | 1020060052386 | 5/2006 |
| WO | WO 2006/024554 | 3/2006 |
| WO | WO 2007/070223 | 6/2007 |

* cited by examiner

| a | e | i |
|---|---|---|
| o | M | u |
| y | n | g |

FIG.3A

| a | M | u |
|---|---|---|
| e | i | o |

FIG.3B

| a |   | u |
|---|---|---|
| e | i | o |

FIG.3C

| a | e | i |
|---|---|---|
| o | u | y |

APPARATUS AND METHOD FOR INPUTTING CHARACTERS ON TOUCH SCREEN OF A TERMINAL

PRIORITY

This application claims priority under 35 U.S.C. §119(a) to Korean Patent Applications filed in the Korean Intellectual Property Office on Jan. 30, 2007, Aug. 7, 2007, and Nov. 5, 2007 and assigned Serial Nos. 2007-9602, 2007-79243, and 2007-112148, respectively, the contents of which are incorporated herein by reference.

BACKGROUND OF THE INVENTION

1. Field of the Invention

The present invention relates generally to an apparatus and method for inputting characters in a terminal, and in particular, to an apparatus and method for inputting characters on a touch keyboard of a terminal.

2. Description of the Related Art

A personal terminal is a generic term indicating any small-size terminal that can be carried. Personal terminals include the Personal Digital Assistant (PDA), the wireless communication terminal, the Moving Pictures Expert Group Layer 3 (MP3) player, the Bluetooth device, and the digital camera. Hereinbelow, the PDA is taken as a personal terminal, by way of example. The PDA has a Central Processing Unit (CPU) being the essential part of a computer, a memory, an Operating System (OS), a variety of OS-based software programs, and peripheral devices and performs the functions of information collection, storage, editing, and search. Recently, the PDA has been developed as a composite device equipped with a portable phone module for being capable of voice call and data communications, such as Internet.

In general, the PDA has a touch screen with a display, such as a Liquid Crystal Display (LCD) and a touch panel installed thereon. A user invokes an intended application by touching an icon displayed on the touch screen with his finger or a pointer, or inputs characters by touching a touch keyboard displayed in a predetermined area of the touch screen.

FIG. 1 illustrates a typical keyboard layout for a conventional terminal. Referring to FIG. 1, a touch screen of the terminal includes a display for displaying input characters, and a touch keyboard for inputting the characters. A keyboard layout for a general Personal Computer (PC) is applied to the touch keyboard.

With the application of the conventional keyboard layout to the terminal, the keyboard is downsized due to a limited touch screen space. As individual keys also are downsized, they do not look good and are inconvenient to use. Hence, a user has difficulty in inputting characters and inputs characters at a decreased speed in a conventional input method for the touch screen.

Accordingly, there is a need for a method for inputting characters using a touch keyboard that facilitates character input in a touch screen of a terminal.

SUMMARY OF THE INVENTION

An aspect of the present invention is to solve at least the problems and/or disadvantages and to provide at least the advantages described below. Accordingly, an aspect of exemplary embodiments of the present invention is to provide an apparatus and method for inputting characters on a touch keyboard that facilitates character input in a touch screen of a terminal.

In accordance with an aspect of the present invention, there is provided an apparatus for inputting a character on a touch keyboard in a terminal, in which a touch screen displays a basic key set and an extended key set, the basic key set includes with consonant keys and the extended key set including character keys corresponding to characters combinable with a consonant corresponding to a consonant key input from the basic key set, and a controller controls the touch screen to display the extended key set, upon input of the consonant key from the basic key set, and receiving at least one character from the basic key set and extended key set.

In accordance with another aspect of the present invention, there is provided a method for inputting a character on a touch keyboard in a terminal, in which a basic key set including with consonant keys is displayed, input of a consonant key from the basic key set is received, an extended key set is displayed over the basic key set, the extended key set including character keys corresponding to characters combinable with a consonant corresponding to the input consonant key, and receiving input of the at least one character key from the extended key set.

In accordance with another aspect of the present invention, there is provided an apparatus for inputting a character in a terminal, in which a touch screen displays a basic key set including a plurality of predetermined square basic character keys and an extended key set in which a plurality of second character keys corresponding to second characters related to a first character corresponding to a first character key selected from among the basic character keys of the basic key set are positioned at least up, down, on the left and on the right of the first character, and a controller controls the touch screen to display the extended key set, upon selection of the first character key from the basic key set, and receives input of at least one second character key from the extended key set. Each of the second character keys is equal in size to the first character key. The second characters keys surround the first character, with the first character centered therein. A touch keyboard is formed in a lower portion of the touch screen, for displaying the basic key set, a display is formed in an upper portion of the touch screen, for displaying a character input by the touch keyboard, and part of the extended key set is displayed on the display. A second character corresponding to a second character key to which a touch movement input is directed on the touch screen is displayed on the display. The extended key set is larger than the first character key and formed not to cover characters displayed on other first character keys neighboring to the first character key. The extended key set is highlighted when it is displayed.

In accordance with another aspect of the present invention, there is provided a method for inputting a character in a terminal, in which a basic key set including a plurality of predetermined square basic character keys is displayed on a touch screen, input of a first character key selected from among the basic character keys of the basic key set is received, an extended key set is displayed, in which a plurality of second character keys corresponding to second characters related to a first character corresponding to the selected first character key are positioned at least up, down, on the left and on the right of the first character, and input of at least one second character key selected from among the second character keys is received from the extended key set. Each of the second character keys is equal in size to the first character key. The second characters keys surround the first character, with the first character centered therein. A touch keyboard is formed in a lower portion of the touch screen, for displaying the basic key set, a display is formed in an upper portion of the touch screen, for displaying a character input by the touch keyboard, and part of the extended key set is displayed on the display. The extended key set is highlighted when it is displayed.

In accordance with another aspect of the present invention, there is provided a method for inputting a character in a terminal, which includes receiving input of a consonant character key touched from among a plurality of consonant keys included in a keypad formed on a touch screen; and displaying a consonant corresponding to the touched consonant key in combination with a character combinable with or related to the consonant according to an input of a drag on the touch screen, after the input of the touched consonant character key.

In accordance with another aspect of the present invention, there is provided a method for inputting a character in a terminal, which includes receiving input of a first character touched from among a plurality of keys included in a keypad formed on a touch screen; and displaying the first character in combination with a character combinable with or related to the first character according to an input of a drag on the touch screen, after the input of the first character.

BRIEF DESCRIPTION OF THE DRAWINGS

The above and other objects, features and advantages of the present invention will become more apparent from the following detailed description when taken in conjunction with the accompanying drawings, in which:

FIG. 1 illustrates a typical keyboard layout for a conventional terminal;

FIGS. 2A and 2B illustrate exemplary basic key sets for inputting Chinese characters according to the present invention;

FIGS. 3A to 3D illustrate exemplary extended key sets for inputting Chinese characters according to the present invention;

FIGS. 4A and 4B illustrate keyboards using a basic key set and an extended key set according to the present invention;

DETAILED DESCRIPTION OF THE EXEMPLARY EMBODIMENTS

Figure 5:
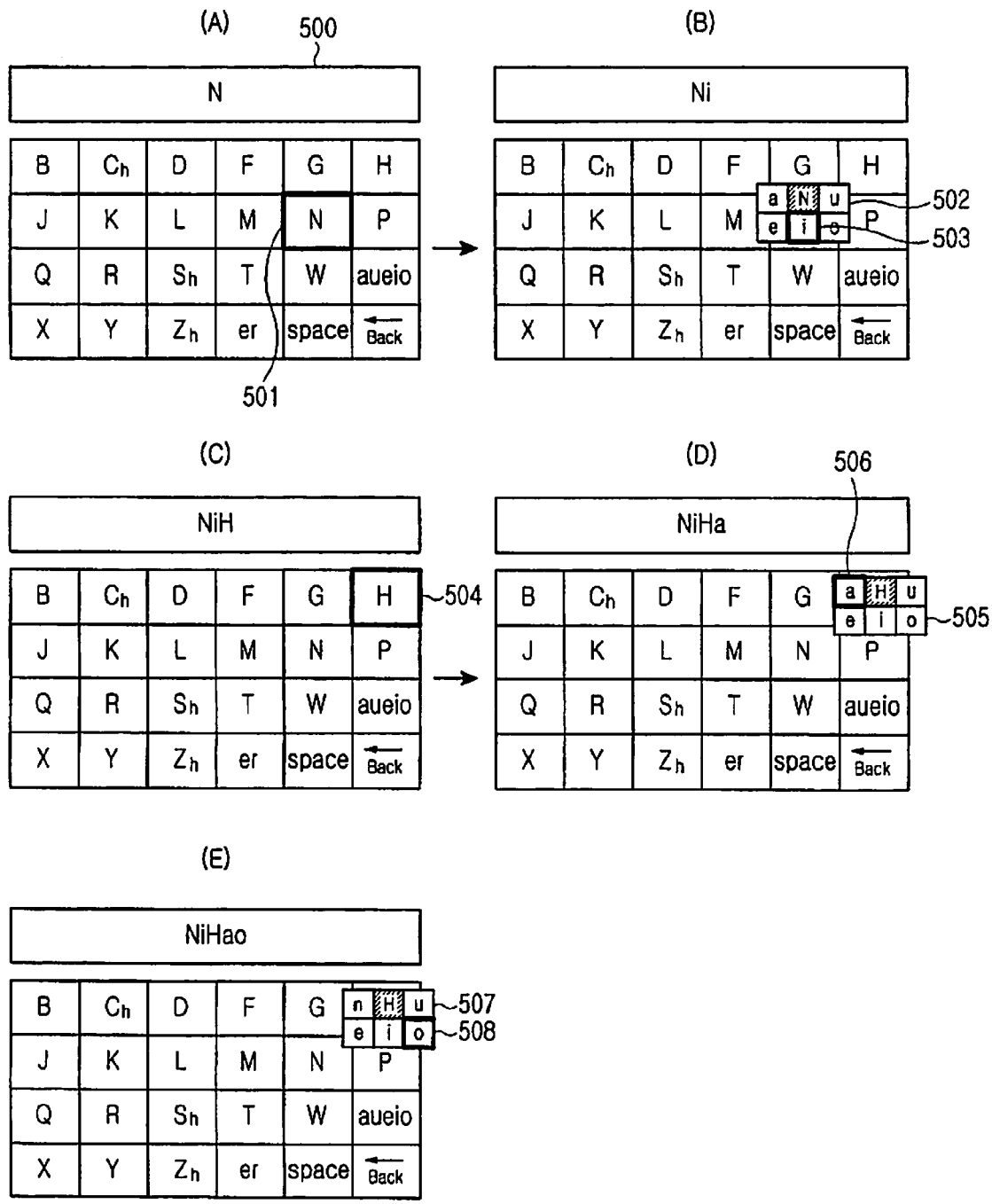
FIGS. 5 to 7 illustrate a method for inputting characters using a touch keyboard according to the present invention.

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A principle of the present invention is that all consonant keys are displayed on a touch keyboard, for character input, and when one consonant key is touched on the touch keyboard, character keys combinable with the input consonant key are displayed in an enlarged pop-up window.

Herein, an initial screen of the touch keyboard, which displays all consonant keys, is defined as a 'basic key set' and a pop-up window that displays character keys combinable with a consonant key input by the basic key set is defined as an 'extended key set'.

While a specific touch keyboard having consonant and vowel keys will be described herein, the number of keys laid out on the touch keyboard can be changed according to their use frequency or usages, and any other key layout is also available. Although the character input method of the present invention is described in the context of Chinese and English, it is to be clearly understood that the present invention is applicable to any language.

Figures 1, 2A, 2B:
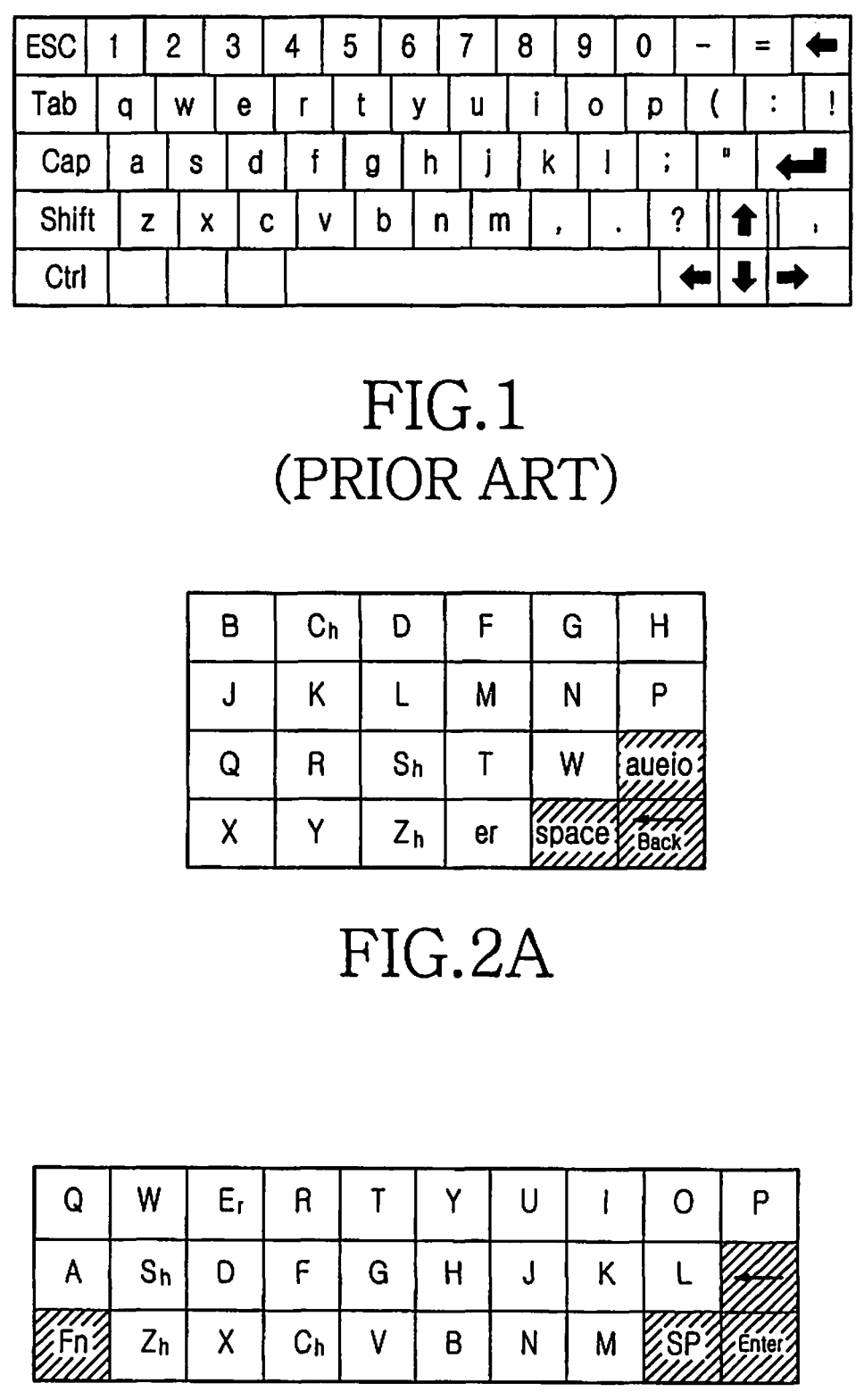

FIGS. 2A and 2B illustrate exemplary basic key sets for inputting Chinese characters according to the present invention. In FIG. 2A, a basic key set for inputting Chinese characters is arranged in a 6×4 layout. Consonants except vowels, a, e, i, o, u are arranged on predetermined keys in an alphabetical order so that B, C, D, F, G, H, J, K, L, M, N P, Q, R, S, T, W, X, Y, Z are arranged in this order. In FIG. 2B, the alphabets of the basic key set are arranged on predetermined keys in a QWERTY layout so that Q, W, R, T, Y, U, I, O, P, A, S, D, F, G, H, J, K, L, Z, X, C, V, B, N, M are arranged in this order. In addition to the consonants, the basic key set further includes an initially inputtable character key, Er for a Chinese PinYin. Also, the basic key set may include a space bar key, a backspace key, and 'a, u, e, i, o' keys for direct input of vowels in addition to the consonant keys and the Er key.

In the basic key sets illustrated in FIGS. 2A and 2B, C, S and Z keys are used to input C or Ch, S or Sh, and Z or Zh. C, S and Z are displayed on the touch screen by touching the C, S and Z keys with a pointer, and Ch, Sh and Zh are displayed on the touch screen by making a short-dragging movement of the C, S and Z keys in predetermined key areas with the pointer.

If the basic key sets are applied to languages other than Chinese and English, the subscripts h of the C, S and Z keys and the subscript r of an E key can be omitted.

Upon input of one consonant key from the basic key set of FIG. 2A or 2B, an extended key set is displayed on the input consonant key or in a display area. A description will be made of the case where the extended key set is displayed in a touch keyboard area, by way of example. Extended key sets available for the basic key set illustrated in FIG. 2A or 2B are illustrated in FIGS. 3A to 3D.

FIGS. 3A to 3D illustrate exemplary extended key sets for inputting Chinese characters according to the present invention. in the area of the extended key sets is large enough to be pointed without inconvenience and each extended key set is large enough to allow other consonants to be pointed in a basic key set.

Referring to FIG. 3A, an extended key set is configured so that an input key (e.g. M) is positioned at the center, and vowels combinable with the input key, a, e, i, o and u, n and g keys often used for a syllable-final consonant in the Chinese language surround the input key. Referring to FIG. 3B, an extended key set is configured so that an input key (e.g. M) is positioned, and combinable vowels a, e, i, o surround the input key. Referring to FIG. 3C, an extended key set is configured to have vowels a, e, i, o and u combinable with an input key. Referring to FIG. 3D, an extended key set is configured to have vowels a, e, i, o, u and y combinable with an input key.

While not shown, the n and g keys frequently used as syllable-final consonants in the Chinese language can be dynamically positioned according to situations and function keys combinable with an input key, such as Space and Backspace (←), can further be included in an extended key set.

In the above extended key sets of FIGS. 3A to 3D, the u key is used for inputting u and ü. U is displayed on the touch screen by touching the u key with the pointer and ü is displayed on the touch screen by making a short dragging movement of the u key in a predetermined key area with the pointer. When the e key is touched or short-dragged in a predetermined key area with the pointer, e or er is displayed on the touch screen.

In the extended key set, upon input of one of the vowel keys, a, e, i, o and u, the input vowel key is changed to an n key frequently used as a syllable-final consonant. If the changed n key is input, the n key is changed to a g key frequently used as a syllable-final consonant. The changed extended key set with the changed key returns to an initial extended key set a predetermined time later.

Figures 4A, 4B:
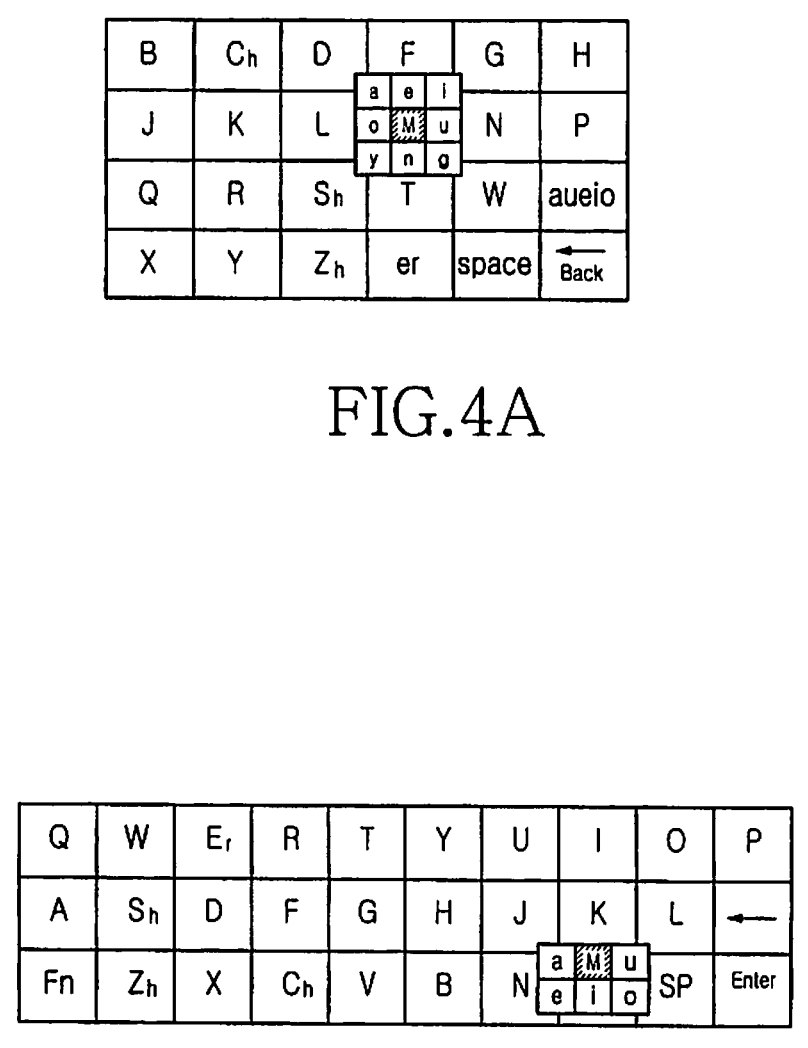

FIGS. 4A and 4B illustrate keyboards using a basic key set and an extended key set according to the present invention. Referring to FIG. 4A, when an M key is input in a basic key set arranged in a 6×4 layout, an extended key set is overlapped over the M key in the basic key set. In the extended key set, the input M key is positioned at the center and vowel keys combinable with the M key (e.g. the vowels a, e, i, o and u in the Chinese language) and frequently used character keys (e.g. n and g in the Chinese language) surround the M key.

Referring to FIG. 4B, when an M key is selected in a basic key set arranged in a QWERTY layout, an extended key set is overlapped over the M key. In the extended key set, vowel keys combinable with the M key (e.g. the vowels a, e, i, o and u in the Chinese language) are positioned around the M key.

Figure 6:
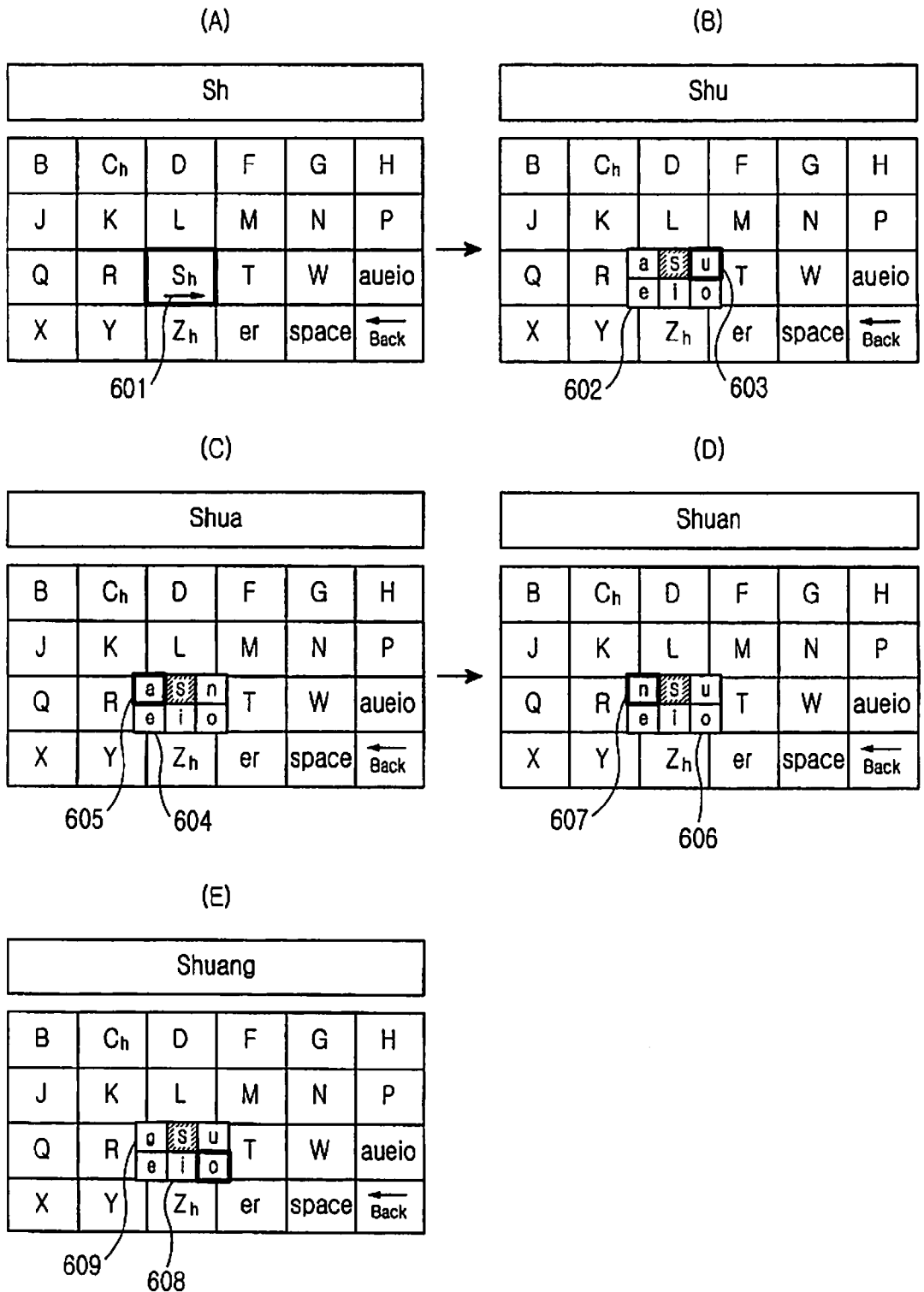
Figure 7:
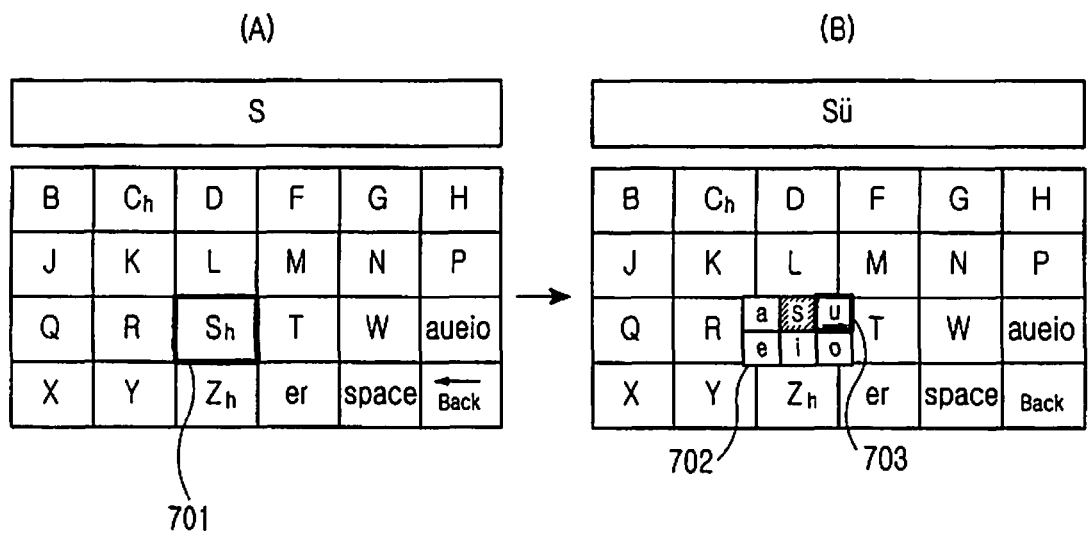

FIGS. 5 to 7 illustrate a method for inputting characters using a touch keyboard according to the present invention.

A case where a user inputs "NiHao" on a touch keyboard having a basic key set of a 6×4 layout is described with reference to FIG. 5. Referring to FIG. 5 (A), when the user searches for an N key 501 for inputting the first consonant N of "NiHao" in the basic key set displayed on the touch keyboard, and touches the N key 501 with a pointer or keeps the pointer on the N key 501 for a predetermined time after the touch, N is displayed on a display 500. In FIG. 5 (B), then, an extended key set 502 for the N key 501 is displayed on the touch keyboard. If the user touches an i key 503 in the extended key set 502 with the pointer, or keeps the pointer on the i key 503 for a predetermined time after the touch, or makes a drag-and-drop movement of the pointer from the N key 501 to the i key 503, Ni is displayed on the display 500.

Referring to FIG. 5 (C), to enter the next letter, consonant H, the user touches an H key 504 in the basic key set displayed on the touch keyboard, or keeps the pointer on the H key 504 for a predetermined time after the touch, or makes a drag-and-drop movement of the pointer from the i key 503 to the H key 504, H is displayed on the display 500. As illustrated in FIG. 5 (D), an extended key set 505 for the H key 504 is displayed on the touch keyboard. Since Ni is a Chinese PinYin, another Chinese character corresponding Ni and H can be displayed on the display 500. The extended key set 502 for the N key 501 can be removed when another consonant (i.e. the consonant H) is displayed. Alternatively, the extended key set 502 for the N key 501 can be removed when the consonant N key is eliminated from the display 500. Referring to FIG. 5 (D), the user touches a key 506 in the extended key set 505, or keeps the pointer on the a key 506 for a predetermined time after the touch, or makes a drag-and-drop movement of the pointer from the H key 504 to the a key 506, Ha is displayed on the display 500. Another Chinese character corresponding to Ni instead of Ni and Ha can be displayed on the display 500.

To enter the next letter, vowel o, the user touches an o key 508 in an extended key set 507 shown in FIG. 5 (E), or keeps the pointer on the o key 508 for a predetermined time after the touch, or makes a drag-and-drop movement of the pointer from the a key 506 to the o key 508, Hao is displayed on the display 500. When a particular key is input, another Chinese character corresponding to Ni and another Chinese character corresponding to Hao can be displayed on the display 500 because Hao is a Chinese PinYin.

A case where the user inputs "Shuang" on the touch keyboard having the basic key set of a 6×4 layout is described with reference to FIG. 6. Referring to FIG. 6 (A), to enter the first letters, consonants S and h simultaneously in the basic key set displayed on the touch keyboard, the user searches for an S key 601, touches the S key 601 with the pointer, and then drags the S key 601 in a predetermined area (i.e. the area of the S key 601) without taking off the pointer for a predetermined time. Then, Sh is displayed on the display. As illustrated in FIG. 6 (B), an extended key set 602 for the S key 601 is displayed. If the user touches a u key 603 in the extended key set 602 with the pointer, or keeps the pointer on the u key 603 for a predetermined time after the touch, or makes a drag-and-drop movement of the pointer from the S key 601 to the u key 603, Shu is displayed on the display. The extended key set 602 is changed to an extended key set 604 including an 'n' key instead of the 'u' key 603.

Referring to FIG. 6 (C), to enter the next letter, vowel a, the user touches an a key 605 in the extended key set 604, or keeps the pointer on the a key 605 for a predetermined time after the touch, or makes a drag-and-drop movement of the pointer from the u key 603 to the a key 605, Shua is displayed on the display. As illustrated in FIG. 6 (D), a changed extended key set 606 is displayed. In the changed extended key set 606, the 'a' key 605 is changed to an 'n' key 607. The user touches the n key 607 in the extended key set 606 or keeps the pointer on the n key 607 for a predetermined time after the touch, Shuan is displayed. Then, a different extended key set 608 is displayed as illustrated in FIG. 6 (E). In the extended key set 608, the 'n' key 607 is replaced by a 'g' key 609. When the user touches the g key 609 in the extended key set 608 or keeps the pointer on the g key 609 for a predetermined time after the touch, Shuang or another Chinese letter corresponding to Shuang is displayed.

A case where the user inputs "S ü" on the touch keyboard having the basic key set of a 6×4 layout is described with reference to FIG. 7. Referring to FIG. 7 (A), to enter the first letter, consonant S in the basic key set displayed on the touch keyboard, the user searches for an S key 701, touches the S key 701 with the pointer or keeps the pointer on the S key 701 for a predetermined time after the touch. Then, S is displayed on the display. As illustrated in FIG. 7 (B), an extended key set 702 for the S key 701 is displayed. If the user touches a u key 703 in the extended key set 702 with the pointer, or keeps the pointer on the u key 703 for a predetermined time after the touch, or makes a short drag-and-drop movement of the pointer from the S key 701 to the u key 703, as indicated by an arrow, S ü or another Chinese letter corresponding to S ü is displayed.

Figure 8:
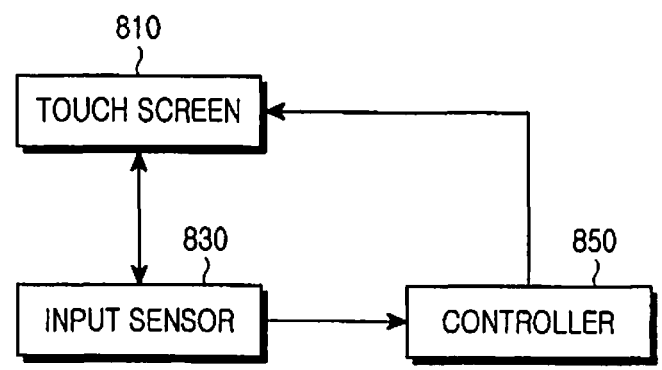
FIG. 8 is a block diagram of an apparatus for inputting characters on a touch keyboard according to the present invention.

FIG. 8 is a block diagram of an apparatus for inputting characters on a touch keyboard according to the present invention. Referring to FIG. 8, the character input apparatus includes a touch screen 810 with a touch keyboard (not shown) and a display (not shown), an input sensor 830, and a controller 850.

The touch screen 810 displays the touch keyboard in the form of a basic key set or a combination of the basic key set and an extended key set and displays a letter corresponding to a key input through the touch keyboard on the display.

When the user touches a particular key on the touch keyboard displayed on the touch screen 810 with a pointer, or keeps the pointer on the key for a predetermined time after the touch, or makes a drag-and-drop movement of the pointer to the key, or dragging the key in a predetermined area, the input sensor 830 senses input of the key and provides the key input to the controller 850.

The controller 850 controls a character corresponding to the key input or its combination with a previously input character to be displayed on the touch keyboard and/or the display area of the touch screen 810 and also controls the basic key set or a combination of the basic set and an extended key set to be displayed on the display of the touch screen 810. That is, the controller 850 initially displays the basic key set. When a consonant key is input from the basic key set, the controller 850 controls the touch screen 810 to display an extended key set over the basic key set. The reason for displaying the input character combination is to illustrate the combination status of the input character and the previously input character.

Figure 9:
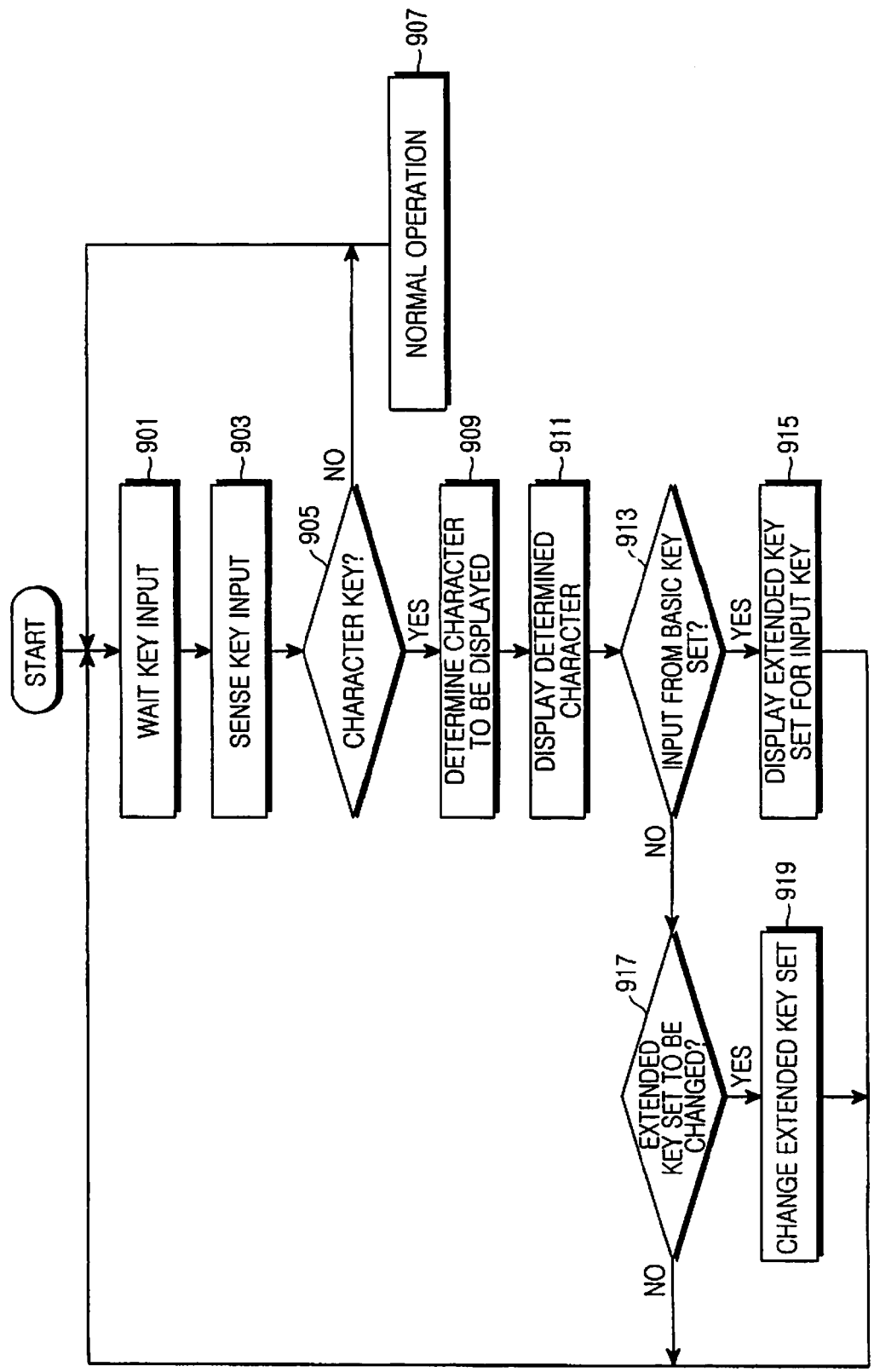
FIG. 9 is a flowchart illustrating a method for inputting characters on a touch keyboard according to the present invention.

FIG. 9 is a flowchart illustrating a method for inputting characters on the touch keyboard according to the present invention. Referring to FIG. 9, the controller 850 controls the touch screen 810 to display a basic key set or a combination of the basic key set and an extended key set and waits key input from the user in step 901.

In step 903, when the input sensor 830 senses input of a particular key from the touch screen 810, the controller 850 receives a sensing result from the input sensor 830 and is aware of the key input from the basic key set or the extended key set. The sensing result may indicate touch of the particular key with the pointer, keeping the pointer on the particular key for a predetermined time after the touch, a drag-and-drop movement of the pointer, or a dragging movement of the pointer in a predetermined area without taking it off for a predetermined time.

The controller 850 determines if the input key is a character in step 905. In the case of a character, the controller 850 goes to step 909. If the key is not a character, the controller 850 operates according to the input key in step 907.

In step 909, the controller 850 determines if the character corresponding to the input key can be combined with a character corresponding to a previous input key. If the characters are combinable, the controller 850 combines the characters and determines that the combined characters are to be displayed on the touch screen 810. If the characters are not combinable (i.e., in the absence of the previous input key), the controller 850 determines that the character corresponding to the input key is to be displayed on the touch screen 810.

For example, in the case of a Chinese character input, the controller 850 combines the character corresponding to the input key with the character corresponding to the previous input key and determines if the combined characters are a Chinese PinYin. In the presence of a Chinese character corresponding to the Chinese PinYin, the controller 850 can determine that the Chinese character is to be displayed on the touch screen 810. Also, in the case of a Chinese character input, when the controller 850 receives a sensing result indicating that the user has made a short-dragging movement of the pointer touching C, S or Z in a predetermined area (i.e. in a C, S or Z key area), it combines a character corresponding to the input key with h and determines that a combined character Ch, Sh or Zh is to be displayed on the touch screen 810. When the sensing result indicates that the user has dragged the pointer touching a u key of an extended key set in a predetermined area (i.e. a U key area), the controller determines that a character ü is to be displayed. The controller 850 controls the touch screen 810 to display the determined character in step 911.

In step 913, the controller 850 determines if the character corresponding to the input key is from the basic key set. If the character corresponding to the input key is from the basic key set, the controller 850 proceeds to step 915 to display an extended key set for the input key. If the character corresponding to the input key is not from the basic key set, the controller 850 goes to step 917 to determine if the extended key set has to be changed.

The controller 850 controls the touch screen 810 to display the extended key set over the input key in step 915 and returns to step 901 to wait a key input from the user. If an extended key set for a previous input key exists on the touch keyboard, the controller 850 removes the extended key set for the previous input key and controls the touch screen 810 to display the touch keyboard including only the extended key set for the current input key in step 915.

If the character corresponding to the input key is from an extended key set, the controller 850 determines if the extended key set has to be changed in step 917. If the controller 850 determines to change the extended key set, the controller 850 changes the extended key set in step 919. If the controller 850 determines not to change the extended key set, the controller 850 returns to step 901 to wait a key input from the user.

As is apparent from the present invention, the present invention advantageously facilitates character input by displaying an extended key set including next available characters for an input key in a pop-up window on a touch keyboard.

Further, the present invention displays an enlarged extended key set with next available characters on a small-size screen, thereby enabling the user to input characters conveniently and fast.

Additionally, the present invention minimizes the number of the character keys displayed on an initial screen through a touch screen using an enlarged extended key set in a terminal.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. An apparatus for inputting a character in a terminal, comprising:
   a touch screen for displaying a basic key set and an extended key set, the basic key set including a plurality of consonant keys and the extended key set including a plurality of character keys corresponding to a plurality of characters combinable with a consonant corresponding to a consonant key input from the basic key set; and
   a controller configured to:
      control the touch screen to display the basic key set,
      in response to a touch on a consonant key of the plurality of consonant keys, control the touch screen to display a pop-up window comprising an extended key set including a key corresponding to the touched consonant key and the plurality of character keys combinable with the key, the key arranged on a center of the pop-up window and the plurality of character keys being arranged to surround at least a part of the key on the pop-up window,
      while the touch is maintained, control the touch screen to display the pop-up window at a touched position of the consonant key, the pop-up window being overlapped with the displayed basic key set, and in response to dragging the touch, input a first consonant character corresponding to the key and a second character corresponding to one of the plurality of character keys, wherein the dragging the touch is a drag and drop movement from the key to the one of the plurality of character keys, and wherein the controller is further configured to simultaneously display two consonant characters including a consonant corresponding to a predetermined key by making a first dragging movement, and display the consonant corresponding to the predetermined key input from the basic key set and a character corresponding to a character key input from the extended key set by making a second dragging movement from the predetermined key to the character key.

2. The apparatus of claim 1, wherein the basic key set includes B, C, D, F, G, H, J, K, L, M, N, P, Q, R, S, T, W, X, Y, and Z keys, and the C, S and Z keys are used to input one of the C and a Ch, one of the S and a Sh, and one of the Z and a Zh, respectively.

3. The apparatus of claim 2, wherein the basic key set further includes an Er key.

4. The apparatus of claim 1, wherein the basic key set further includes an Er key.

5. The apparatus of claim 2, wherein one of the C and Ch, one of the S and Sh, and one of the Z and Zh are displayed upon touching of the C, S and Z keys, respectively.

6. The apparatus of claim 1, wherein the first dragging movement is a short dragging movement on the predetermined key in the basic key set.

7. The apparatus of claim 1, wherein the extended key set includes a, e, i, o and u keys.

8. The apparatus of claim 7, wherein the extended key set further includes at least one of a y key, an n key, and a g key.

9. The apparatus of claim 8, wherein one of the u and a ü is displayed upon touching the u key or making a short dragging movement on the u key in a predetermined area.

10. The apparatus of claim 9, wherein when at least one of the a, e, i, o and u keys are input from the extended key set, the input key is changed to the n key in the extended key set, and when the n key is input, the n key is changed to the g key in the extended key set displayed on the touch screen.

11. The apparatus of claim 1, wherein when another consonant key is input with the basic key set displayed, the extended key set disappears from the touch screen.

12. The apparatus of claim 1, wherein when the combination of the first consonant character and the second character is displayed, the extended key set disappears from the touch screen.

13. The apparatus of claim 1, wherein, upon receiving input of the consonant key from the basic key set, the character keys of the extended key set are displayed surrounding the consonant key.

14. A method for inputting a character in a terminal, comprising:

controlling a touch screen to display a basic key set including a plurality of consonant keys;

in response to a touch on a consonant key of the plurality of consonant keys, controlling the touch screen to display a pop-up window comprising an extended key set including a key corresponding to the touched consonant key and a plurality of character keys combinable with the key, the key arranged on a center of the pop-up window and the plurality of character keys being arranged to surround at least a part of the key on the pop-up window;

while the touch is maintained, controlling the touch screen to display the pop-up window at a touched position of the consonant key, the pop-up window being overlapped with the displayed basic key set;

in response to dragging the touch, receiving input of a first consonant character corresponding to the key and a second character corresponding to one of the plurality of character keys; and simultaneously displaying two consonant characters including a consonant corresponding to a predetermined key by making a first dragging movement, and displaying the consonant corresponding to the predetermined key input from the basic key and a character corresponding to a character key input from the extended key set by making a second dragging movement from the predetermined key to the character key, wherein the dragging the touch is a drag and drop movement from the key to the one of the plurality of character keys.

15. The method of claim 14, wherein the basic key set includes at least one of a first basic key set and a second basic key set, the first basic key set includes B, C, D, F, G, H, J, K, L, M, N, P, Q, R, S, T, W, X, Y, and Z keys and the second basic key includes Q, W, R, T, Y, U, I, O, P, A, S, D, F, G, H, J, K, L, Z, X, C, V, B, N and M keys, and the C, S and Z keys are used to input one of the C and a Ch, one of the S and a Sh, and one of the Z and a Zh, respectively.

16. The method of claim 15, wherein each of the first basic key set and the second basic set further includes an Er key.

17. The method of claim 15, wherein one of C and Ch, one of S and Sh, and one of Z and Zh are displayed upon touching C, S and Z keys, respectively.

18. The method of claim 14, wherein the first dragging movement is a short dragging movement on the predetermined key in the basic key set.

19. The method of claim 14, wherein the extended key set includes a, e, i, o and u keys.

20. The method of claim 19, wherein the extended key set further includes at least one of the input consonant key, a y key, an n key, and a g key.

21. The method of claim 19, wherein one of the u and a ü is displayed upon touching the u key or making a short dragging movement on the u key in a predetermined area.

22. The method of claim 20, wherein when at least one of the a, e, i, o and u keys are input from the extended key set, the input key is changed to the n key in the extended key set, and when the n key is input, the n key is changed to the g key in the extended key set displayed on the touch screen.

23. The method of claim 14, wherein when the combination of the consonant and the character corresponding to the character key is displayed, the extended key set disappears from the touch screen.

24. A method for inputting a character in a terminal, comprising:

receiving input of a consonant character key touched from among a plurality of consonant keys included in a keypad formed on a touch screen;

in response to a touch on the consonant character key, controlling the touch screen to display a pop-up window comprising an extended key set including a key corresponding to the touched consonant character key and a plurality of character keys combinable with the key, the key arranged on a center of the pop-up window and the plurality of character keys being arranged to surround at least a part of the key on the pop-up window;

while the touch is maintained, controlling the touch screen to display the pop-up window at a touched position of the consonant character key, the pop-up window being overlapped with the keypad;

in response to dragging the touch, receiving input of a first consonant character corresponding to the key and a second character corresponding to one of the plurality of character keys; and simultaneously displaying two consonant characters including a consonant corresponding to a predetermined key by making a first dragging movement, and displaying the consonant corresponding to the predetermined key input from the basic key and a character corresponding to a character key input from the extended key set by making a second dragging movement from the predetermined key to the character key, wherein the dragging the touch is a drag and drop movement from the key to the one of the plurality of character keys.

25. A method for inputting a character in a terminal, comprising:

receiving input of a first character key touched from among a plurality of keys included in a keypad formed on a touch screen;

in response to a touch on the first character key, controlling the touch screen to display a pop-up window comprising an extended key set including a key corresponding to the touched first character key and a plurality of second character keys combinable with the key, the key arranged on a center of the pop-up window and the plurality of second character keys being arranged adjacent to the key on the pop-up window;

while the touch is maintained, controlling the touch screen to display the pop-up window at a touched position of the touched first character key, the pop-up window being overlapped with the keypad;

in response to dragging the touch, receiving input of a first consonant character corresponding to the key and a second character corresponding to one of the plurality of second character keys; and simultaneously displaying two consonant characters including a consonant corresponding to a predetermined key by making a first dragging movement, and displaying the consonant corresponding to the predetermined key input from the basic key and a character corresponding to a character key input from the extended key set by making a second dragging movement from the predetermined key to the character key, wherein the dragging the touch is a drag and drop movement from the key to the one of the plurality of second character keys.

26. A method for inputting a character in a terminal, comprising:

controlling a touch screen to display a basic key set including a first number of rectangular-type keys on the touch screen;

in response to a touch on a first character key of the first number of rectangular-type keys, controlling the touch screen to display a pop-up window comprising an extended key set including a key corresponding to the touched first character key and an extended key set including a plurality of second number of rectangular-type keys combinable with the key, the key arranged on a center of the pop-up window and the plurality of second number of rectangular-type keys being arranged to surround a plurality of sides of the key on the pop-up window;

while the touch is maintained, controlling the touch screen to display the pop-up window at a touched position of the touched first character key, the pop-up window being overlapped with the displayed basic key set;

in response to dragging the touch, receiving input of a first consonant character corresponding to the key and a second character corresponding to one of the plurality of second number of rectangular-type keys; and simultaneously displaying two consonant characters including a consonant corresponding to a predetermined key by making a first dragging movement, and displaying the consonant corresponding to the predetermined key input from the basic key and a character corresponding to a character key input from the extended key set by making a second dragging movement from the predetermined key to the character key, wherein the dragging the touch is a drag and drop movement from the key to the one of the plurality of second number of rectangular-type keys.

27. A method for inputting a character in a terminal, comprising:

controlling a touch screen to display a basic key set including a first number of rectangular-type keys on the touch screen;

in response to a touch on a first character key of the first number of rectangular-type keys, controlling the touch screen to display a pop-up window comprising an extended key set including a key corresponding to the touched first character key and a plurality of a second number of rectangular-type keys combinable with the key, the key arranged on a center of the pop-up window and the plurality of the second number of rectangular-type keys being arranged to surround a plurality of sides of the key on the pop-up window, wherein the extended key set is provided in a form of a 3×3 layout or a 3×2 layout;

while the touch is maintained, controlling the touch screen to display the pop-up window at a touched position of the touched first character key, the pop-up window being overlapped with the displayed basic key set;

in response to dragging the touch, receiving input of a first consonant character corresponding to the key and a second character corresponding to one of the plurality second number of rectangular-type keys; and simultaneously displaying two consonant characters including a consonant corresponding to a predetermined key by making a first dragging movement, and displaying the consonant corresponding to the predetermined key input from the basic key and a character corresponding to a character key input from the extended key set by making a second dragging movement from the predetermined key to the character key, wherein the second character is displayed in a direction of the dragging of the touch.

28. A method for inputting a character in a terminal, comprising:

controlling a touch screen to display a basic key set including a first number of rectangular-type keys on the touch screen;

in response to a touch on a first character key of the first number of rectangular-type keys, controlling the touch screen to display a pop-up window comprising an extended key set including a key corresponding to the touched first character key and a plurality of a second number of rectangular-type keys combinable with the key, the key arranged on a center of the pop-up window and the plurality of the second number of rectangular-type keys being arranged to surround a plurality of sides of the touched first character key on the pop-up window, wherein the extended key set is provided in a form of a 3×3 layout or a 3×2 layout;

while the touch is maintained, controlling the touch screen to display the pop-up window at a touched position of the touched first character key, the pop-up window being overlapped with the keypad;

in response to dragging the touch, receiving input of a first consonant character corresponding to the key and a second character corresponding to one of the plurality second number of rectangular-type keys, and simultaneously displaying two consonant characters including a consonant corresponding to a predetermined key by making a first dragging movement, and displaying the consonant corresponding to the predetermined key input from the basic key and a character corresponding to a character key input from the extended key set by making a second dragging movement from the predetermined key to the character key, wherein the second character is displayed in a direction of the dragging of the touch.

* * * * *